United States Patent [19]

Storm et al.

[11] 4,062,647

[45] Dec. 13, 1977

[54] CLAY-CONTAINING FABRIC SOFTENING DETERGENT COMPOSITIONS

[75] Inventors: Thomas D. Storm, Waterloo, Belgium; Joseph P. Nirschl, Fairfield, Ohio

[73] Assignee: The Procter & Gamble Company, Cincinnati, Ohio

[21] Appl. No.: 486,274

[22] Filed: July 8, 1974

Related U.S. Application Data

[63] Continuation-in-part of Ser. No. 271,943, July 14, 1972, abandoned.

[51] Int. Cl.[2] ......................... C09K 3/16; C11D 3/12; C11D 3/14; D06M 11/06

[52] U.S. Cl. ......................................... 8/137; 252/8.6; 252/8.7; 252/8.8; 252/89 R; 252/135; 252/140; 252/155

[58] Field of Search ............... 252/140, 534, DIG. 11, 252/113, 116, 120, 128, 131, 133, 155, 160, 531, 532, 533, 535, 536, 8.8, 8.6, 179; 8/137

[56] References Cited

U.S. PATENT DOCUMENTS

| | | | |
|---|---|---|---|
| 2,187,536 | 1/1940 | Avedikian | 252/116 |
| 2,531,427 | 11/1950 | Hauser | 260/448 |
| 2,587,505 | 2/1952 | Moody | 117/139.5 X |
| 2,594,257 | 4/1952 | Durgin | 252/140 |
| 2,594,258 | 4/1952 | Durgin | 252/140 |
| 2,746,887 | 5/1956 | O'Neil | 117/139.5 |
| 2,805,993 | 9/1957 | Barnard et al. | 252/8.8 |
| 3,033,699 | 5/1962 | Aarons et al. | 106/286 |
| 3,574,120 | 4/1971 | Siebert et al. | 252/132 |
| 3,594,212 | 7/1971 | Ditsch | 117/62 |
| 3,594,221 | 7/1971 | Baldwin | 117/138.5 |
| 3,625,905 | 12/1971 | Weast | 252/109 |
| 3,716,488 | 2/1973 | Kolsky et al. | 252/155 |

FOREIGN PATENT DOCUMENTS

| | | |
|---|---|---|
| 461,221 | 2/1937 | United Kingdom. |

*Primary Examiner*—Dennis L. Albrecht
*Attorney, Agent, or Firm*—Steven J. Goldstein; Julius P. Filcik; Robert B. Aylor

[57] ABSTRACT

Granular, built laundry detergent compositions containing particular smectite clay minerals. Compositions containing such clays provide softening and/or antistatic benefits to fabrics washed therein.

10 Claims, No Drawings

CLAY-CONTAINING FABRIC SOFTENING DETERGENT COMPOSITIONS

CROSS-REFERENCE TO RELATED APPLICATION

This is a continuation-in-part application of copending U.S. patent application Ser. No. 271,943; filed July 14, 1972; entitled DETERGENT COMPOSITIONS; inventors: Thomas D. Storm and Joseph P. Nirschl, now abandoned.

BACKGROUND OF THE INVENTION

The instant invention relates to granular built laundry detergent compositions which provide simultaneous laundering and fabric feel benefits during conventional fabric laundering operations. Such compositions employ a combination of non-soap synthetic detergent compounds, organic or inorganic detergent builders and particular smectite clay minerals having particular cation exchange characteristics.

Various clay materials have been utilized in many different types of detergent systems for widely diverse purposes. Clays, for example, have been disclosed for utilization as builders (Schwartz and Perry, *Surface Active Agents,* Interscience Publishers, Inc., 1949, pp. 232 and 299); as water-softeners (British Patent Nos. 461,221 and 401,413); as anticaking agents (U.S. Pat. Nos. 2,625,513 and 2,770,600); as suspending agents (U.S. Pat. Nos. 2,594,257; 2,594,258; and 2,920,045 and British Patent No. 1,294,253); as soil release agents (U.S. Pat. No. 3,716,488); and as fillers (U.S. Pat. No. 2,708,185).

It is also well known that some clay materials can be deposited on fabrics to impart softening and antistatic properties thereto. Such clay deposition is generally realized by contacting fabrics to be so treated with aqueous clay suspensions (See, for example, U.S. Pat. Nos. 3,033,699 and 3,594,212) under closely controlled conditions that can be realized during commercial manufacturing and treatment processes. Furthermore such commercial processes utilize clay concentrations in the range of 0.25% to 6% by weight, whereas at the conventional usage levels of laundry detergent compositions, clay minerals incorporated therein will be present at concentrations of 0.001% to 0.1% by weight of the wash liquor.

Attempts, however, to incorporate clay materials into built detergent systems for the purpose of providing simultaneous fabric laundering and fabric feel benefits have not been entirely successful. Conventional detergent builders tend to retard or inhibit the tendency of clays to deposit on fabric surfaces, such deposition being necessary to realize the desired fabric softening and/or static reduction. Furthermore, to provide the requisite uniform deposition of clay material onto fabrics being laundered, it must be thoroughly and quickly dispersed throughout the fabric laundering solution during the relatively brief wash cycle.

Some of these difficulties of providing through-the-wash clay softening have been resolved bby utilizing conventional fabric softening agents such as isostearic acid or polyamine or polyquaternary ammonium compounds in combination with clay in built detergent formulations (See U.S. Pat. Nos. 3,594,212 and 3,625,905). The teaching of these disclosures is that amine modification of the clay material is necessary or desirable for satisfactory fabric softening performance.

Accordingly, it is an object of the present invention to provide compositions which can be employed to yield simultaneous fabric laundering and fabric feel benefits.

It is a further object of the present invention to provide such laundering and softening compositions in the form of built granular formulations.

It has surprisingly been discovered that by utilizing particular types of clay having particular cation exchange characteristics, these objectives can be realized and built granular fabric laundering, softening and antistatic compositions can be obtained which are unexpectedly superior to similar compositions known to the prior art.

SUMMARY OF THE INVENTION

The present invention encompasses granular built laundry detergent compositions comprising: (a) from about 2% to about 30% by weight of a non-soap synthetic detergent selected from the group consisting of anionic synthetic detergents, nonionic synthetic detergents, ampholytic synthetic detergents, zwitterionic synthetic detergents and mixtures thereof; (b) from about 10% to about 60% by weight of an organic or inorganic detergent builder salt; and (c) from about 1% to about 50% by weight of a smectite clay selected from the group consisting of alkali and alkaline earth metal montmorillonites, saponites and hectorites having an ion exchange capacity of at least about 50 meq/100 g, such compositions provide a solution pH of from about 7 to about 12 when dissolved in water at a concentration of about 0.12% by weight. In a method aspect, the invention encompasses methods for concurrently cleansing and treating fabrics comprising laundering said fabrics in an aqueous laundry bath containing an effective amount (e.g., from about 0.02% to about 2% by weight) of a laundry detergent composition as described above.

DETAILED DESCRIPTION OF THE INVENTION

Compositions of the instant invention comprise three essential components — synthetic non-soap detergent, builder salt and clay mineral. Each component is described in detail as follows:

Synthetic Detergent

From about 2% to about 30% by weight, preferably from about 5% to about 20% by weight, of the instant compositions comprise a non-soap synthetic detergent selected from the group consisting of anionic synthetic detergents, nonionic synthetic detergents, ampholytic synthetic detergents, and zwitterionic synthetic detergents. For the purposes of the fabric softening aspect of the present invention, non-ionic surfactants should not form the major portion, i.e. $>50\%$ of the total surfactant present but can provide a minor proportion, e.g., from 10–35% by weight of the total surfactant mixture. Examples of synthetic detergents of the types are described as follows:

Anionic Detergents

Anionic synthetic detergents include water-soluble salts, particularly the alkali metal salts, of organic sulfuric reaction products having in their molecular structure an alkyl group containing from about 8 to about 22 carbon atoms and a moiety selected from the group consisting of sulfonic acid and sulfuric acid ester moieties. (Included in the term alkyl is the alkyl portion of higher acyl moieties.) Examples of this group of synthetic detergents which form a part of the preferred built detergent compositions of the present invention are the sodium and potassium alkyl sulfates, especially those obtained by sulfating the higher alcohols ($C_8$ – $C_{18}$ carbon atoms) produced by reducing the glycerides of tallow or coconut oil; sodium and potassium alkyl benzene sulfonates, in which the alkyl group contains from about 9 to about 20 carbon atoms in straight chain or branched-chain configuration, e.g. those of the type described in U.S. Pat. Nos. 2,220,099 and 2,477,383 (especially valuable are linear straight chain alkyl benzene sulfonates in which the average of the alkyl groups is about 11.8 carbon atoms and commonly abbreviated as $C_{11.8}$ LAS); sodium alkyl glyceryl ether sulfonates, especially those ethers of higher alcohols derived from tallow and coconut oil; sodium coconut oil fatty acid monoglyceride sulfonates and sulfates.

Anionic phosphate surfactants are also useful in the present invention. These are surface active materials having substantial detergent capability in which the anionic solubilizing group connecting hydrophobic moieties is an oxy acid of phosphorus. The more common solubilizing groups, of course, are $—SO_4H$ and $—SO_3H$. Alkyl phosphate esters such as $(R\text{-}O)_2PO_2H$ and $ROPO_3H_2$ in which R represents an alkyl chain containing from about 8 to about 20 carbon atoms are useful herein.

These phosphate esters can be modified by including in the molecule from one to about 40 alkylene oxide units, e.g., ethylene oxide units. Formulae for these modified phosphate anionic detergents are

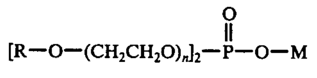

or

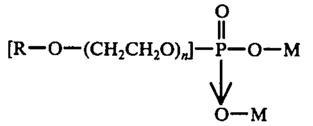

in which R represents an alkyl group containing from about 8 to 20 carbon atoms, or an alkylphenyl group in which the alkyl group contains from about 8 to 20 carbon atoms, and M represents a soluble cation such as hydrogen, sodium, potassium, ammonium or substituted ammonium; and in which *n* is an integer from 1 to about 40.

Another class of suitable anionic organic detergents particularly useful in this invention includes salts of 2-acyloxy-alkane-1-sulfonic acids. These salts have the formula

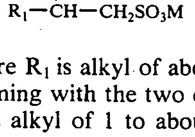

where $R_1$ is alkyl of about 9 to about 23 carbon atoms (forming with the two carbon atoms an alkane group); $R_2$ is alkyl of 1 to about 8 carbon atoms; and M is a water-soluble cation.

The water-soluble cation, M, in the hereinbefore described structural formula can be, for example, an alkali metal cation (e.g., sodium, potassium, lithium), ammonium or substituted-ammonium cation. Specific examples of substituted ammonium cations include methyl-, dimethyl-, and trimethylammonium cations and quaternary ammonium cations such as tetramethylammonium and dimethyl piperidinium cations and those derived from alkylamines such as ethylamine, diethylamine, triethylamine, mixtures thereof, and the like.

Specific examples of beta-acyloxy-alkane-1-sulfonates, or alternatively 2-acyloxy-alkane-1-sulfonates, useful herein include the sodium salt of 2-acetoxy-tridecane-1-sulfonic acid; the potassium salt of 2-propionyloxy-tetradecane-1-sulfonic acid; the lithium salt of 2-butanoyloxy-tetradecane-1-sulfonic acid; the sodium salt of 2-pentanoyloxy-pentadecane-1-sulfonic acid; the sodium salt of 2-acetoxy-hexadecane-1-sulfonic acid; the potassium salt of 2-octanoyloxy-tetradecane-1-sulfonic acid; the sodium salt of 2-acetoxy-heptadecane-1-sulfonic acid; the lithium salt of 2-acetoxy-octadecane-1-sulfonic acid; the potassium salt of 2-acetoxy-nonadecane-1-sulfonic acid; the sodium salt of 2-acetoxy-uncosane-1-sulfonic acid; the sodium salt of 2-propionyloxy-docosane-1-sulfonic acid; the isomers thereof.

Preferred beta-acyloxy-alkane-1-sulfonate salts herein are the alkali metal salts of beta-acetoxy-alkane-1-sulfonic acids corresponding to the above formula wherein $R_1$ is an alkyl of about 12 to about 16 carbon atoms, these salts being preferred from the standpoints of their excellent cleaning properties and ready availability.

Typical examples of the above described beta-acetoxy alkanesulfonates are described in the literature: Belgium Patent 650,323 issued July 9, 1963, discloses the preparation of certain 2-acyloxy alkanesulfonic acids. Similarly, U.S. Pat. Nos. 2,094,451 issued Sept. 28, 1937, to Guenther et al. and 2,086,215 issued July 6, 1937 to DeGroote disclose certain salts of beta-acetoxy alkanesulfonic acids. These references are hereby incorporated by reference.

Another preferred class of anionic detergent compounds herein, both by virtue of superior cleaning properties and low sensitivity to water hardness ($Ca^{++}$ and $Mg^{++}$ ions) are the alkylated α-sulfocarboxylates, containing about 10 to about 23 carbon atoms, and having the formula

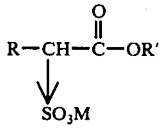

wherein R is $C_8$ to $C_{20}$ alkyl, M is a water-soluble cation as hereinbefore disclosed, preferably sodium ion, and R′ is either short chain alkyl, e.g., methyl, ethyl, propyl and butyl or medium-chain alkyl, e.g., hexyl, heptyl, octyl and nonyl. In the latter case, i.e., the medium chain esters, the total number of carbon atoms should ideally be in the range of 18–20 for optimum performance. These compounds are prepared by the esterification of α-sulfonated carboxylic acids, which are commercially available, using standard techniques. Specific examples of the alkylated α-sulfocarboxylates preferred for use herein include:

a.

short chain esters ammonium methyl-α-sulfopalmitate, triethanolammonium ethyl-α-sulfostearate,
sodium methyl-α-sulfopalmitate,
sodium ethyl-α-sulfopalmitate,
sodium butyl-α-sulfostearate,
potassium methyl-α-sulfolaurate,
lithium methyl-α-sulfolaurate,
as well as mixtures thereof;
b.
medium chain esters
sodium hexyl-α-sulphomyristate
potassium octyl-α-sulpholaurate
ammonium-2-methyl hexyl-α-sulpholaurate,
and mixtures thereof.

A preferred class of anionic organic detergents are the β-alkyloxy alkane sulfonates. These compounds have the following formula:

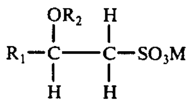

where $R_1$ is a straight chain alkyl group having from 6 to 20 carbon atoms, $R_2$ is a lower alkyl group having from 1 (preferred) to 3 carbon atoms, and M is a water-soluble cation as hereinbefore described.

Specific examples of β-alkyloxy alkane sulfonates, or alternatively 2-alkyloxy-alkane-1-sulfonates, having low hardness (calcium ion) sensitivity useful herein to provide superior cleaning levels under household washing conditions include:

potassium-β-methoxydecanesulfonate,
sodium 2-methoxytridecanesulfonate,
potassium 2-ethoxytetradecylsulfonate,
sodium 2-isopropoxyhexadecylsulfonate,
lithium 2-t-butoxytetradecylsulfonate,
sodium β-methoxyoctadecylsulfonate, and
ammonium β-n-propoxydodecylsulfonate.

Another class of preferred synthetic anionic detergents are water-soluble salts of the organic, sulfuric acid reaction products of the general formula $$R_1 - SO_3 - M$$

wherein $R_1$ is chosen from the group consisting of a straight or branched, saturated aliphatic hydrocarbon radical having from 8 to 24, preferably from 12 to 18 carbon atoms, and M is a cation. Important examples useful in the present invention are the salts of an organic sulfuric acid reaction product of a hydrocarbon of the methane series, including iso-, neo-, meso-, and n-paraffins, having 8 to 24 carbon atoms, preferably 12 to 18 carbon atoms; and a sulfonating agent, e.g., $SO_3$, $H_2SO_4$, oleum, obtained according to known sulfonation methods, including bleaching and hydrolysis. Preferred are sulfonated $C_{12-18}$ n-paraffins.

Other synthetic anionic detergents useful herein are alkyl ether sulfates. These materials have the formula $RO(C_2H_4O)_xSO_3M$ wherein R is alkyl or alkenyl of about 10 to about 20 carbon atoms, $x$ is 1 to 30, and M is a water-soluble cation as defined hereinbefore. The alkyl ether sulfates useful in the present invention are condensation products of ethylene oxide and monohydric alcohols having about 10 to about 20 carbon atoms. Preferably, R has 14 to 18 carbon atoms. The alcohols can be derived from fats, e.g., coconut oil or tallow, or can be synthetic. Lauryl alcohol and straight chain alcohols derived from tallow are preferred herein. Such alcohols are reacted with 1 to 30, and especially 6, molar proportions of ethylene oxide and the resulting mixture of molecular species, having, for example, an average of 6 moles of ethylene oxide per mole of alcohol, is sulfated and neutralized.

Specific examples of alkyl ether sulfates of the present invention are sodium coconut alkyl triethylene glycol ether sulfate; lithium tallow alkyl triethylene glycol ether sulfate; and sodium tallow alkyl hexaoxyethylene sulfate.

Highly preferred alkyl ether sulfates are those comprising a mixture of individual compounds, said mixture having an average alkyl chain length of from about 12 to 16 carbon atoms and an average degree of ethoxylation of from about 1 to 4 moles of ethylene oxide. Such a mixture must also comprise from about 0% to 20% by weight $C_{12-13}$ compounds; from 60% to 100% by weight $C_{14-15-16}$ compounds; from about 0% to 20% by weight of $C_{17-18-19}$ compounds; from about 3% to 30% by weight of compounds having a degree of ethoxylation of 0; from about 45% to 90% by weight of compounds having a degree of ethoxylation of from 1 to 4; from about 10% to 25% by weight of compounds having a degree of ethoxylation of from 4 to 8; and from about 0.1% to 15% by weight of compounds having a degree of ethoxylation greater than 8.

Additional examples of anionic synthetic detergents which come within the terms of the present invention are the reaction product of fatty acids esterified with isethionic acid and neutralized with sodium hydroxide where, for example, the fatty acids are derived from coconut oil; sodium or potassium salts of fatty acid amides of methyl tauride in which the fatty acids, for example, are derived from coconut oil. Other anionic synthetic detergents of this variety are set forth in U.S. Pat. Nos. 2,486,921; 2,486,922; and 2,396,278.

Additional examples of anionic synthetic detergents, which come within the terms of the present invention, are the compounds which contain two anionic functional groups. These are referred to as di-anionic detergents. Suitable di-anionic detergents are the disulfonates, disulfates, or mixtures thereof which may be represented by the following formulae:

$$R(SO_3)_2M_2,\ R(SO_4)_2M_2,\ R(SO_3)\ (SO_4)M_2,$$

where R is an acyclic aliphatic hydrocarbyl group having 15 to 20 carbon atoms and M is a water-solubilizing cation, for example, the $C_{15}$ to $C_{20}$ disodium 1,2-alkyldisulfates, $C_{15}$ to $C_{20}$ dipotassium-1,2-alkyldisulfonates or disulfates, disodium 1,9-hexadecyl disulfates, $C_{15}$ to $C_{20}$ disodium-1,2-alkyldisulfonates, disodium 1,9-stearyldisulfates and 6,10-octadecyldisulfates.

The aliphatic portion of the disulfates or disulfonates is generally substantially linear, thereby imparting desirable biodegradable properties to the detergent compound.

The water-solubilizing cations include the customary cations known in the detergent art, i.e., the alkali metals, and the ammonium cations, as well as other metals in group IIA, IIB, IIIA, IVA and IVB of the Periodic Table except for boron. The preferred water-solubilizing cations are sodium or potassium. These dianionic detergents are more fully described in British Letters Patent 1,151,392 which claims priority on an application made in the United States of America (Ser. No. 564,556) on July 12, 1966.

Still other anionic synthetic detergents include the class designated as succinamates. This class includes such surface active agents as disodium N-octadecylsulfosuccinamate; tetrasodium N-(1,2-dicarboxyethyl)-N-octadecylsulfo-succinamate; diamyl ester of sodium sulfosuccinic acid; dihexyl ester of sodium sulfosuccinic acid; dioctyl esters of sodium sulfosuccinic acid.

Other suitable anionic detergents utilizable herein are olefin sulfonates having about 12 to about 24 carbon atoms. The term "olefin sulfonates" is used herein to mean compounds which can be produced by the sulfonation of $\alpha$-olefins by means of uncomplexed sulfur trioxide, followed by neutralization of the acid reaction mixture in conditions such that any sultones which have been formed in the reaction are hydrolyzed to give the corresponding hydroxy-alkane-sulfonates. The sulfur trioxide can be liquid or gaseous, and is usually, but not necessarily, diluted by inert diluents, for example by liquid $SO_2$, chlorinated hydrocarbons, etc., when used in the liquid form, or by air, nitrogen, gaseous $SO_2$, etc., when used in the gaseous form.

The $\alpha$-olefins from which the olefin sulfonates are derived are mono-olefins having 12 to 24 carbon atoms, preferably 14 to 16 carbon atoms. Preferably, they are straight chain olefins. Examples of suitable 1-olefins include 1-dodecene; 1-tetradecene; 1-hexadecene; 1-octadecene; 1-eicosene and 1-tetracosene.

In addition to the true alkene sulfonates and a proportion of hydroxy-alkanesulfonates, the olefin sulfonates can contain minor amounts of other materials, such as alkene disulfonates depending upon the reaction conditions, proportion of reactants, the nature of the starting olefins and impurities in the olefin stock and side reactions during the sulfonation process.

A specific olefin sulfonate detergent is described more fully in the U.S. Pat. No. 3,332,880 of Phillip F. Pflaumer and Adrian Kessler, issued July 25, 1967, titled "Detergent Composition," the disclosure of which is incorporated herein by reference.

Of all the above-described types of anionic surfactants, preferred compounds include sodium linear alkyl benzene sulfonate wherein the alkyl chain averages from about 10 to 18, more preferably about 12, carbon atoms in length, sodium tallow alkyl sulfate; 2-acetoxy-tridecane-1-sulfonic acid; sodium methyl-$\alpha$-sulfopalmitate; sodium-$\beta$-methoxyoctadecylsulfonate; sodium coconut alkyl ethylene glycol ether sulfonate; the sodium salt of the sulfuric acid ester of the reaction product of one mole of tallow alcohol and three moles of ethylene oxide; and mixtures thereof.

Nonionic Synthetic Detergents

Most commonly, nonionic surfactants are compounds produced by the condensation of an alkylene oxide (hydrophilic in nature) with an organic hydrophobic compound which is usually aliphatic or alkyl aromatic in nature. The length of the hydrophilic or polyoxyalkylene moiety which is condensed with any particular hydrophobic compound can be readily adjusted to yield a water-soluble compound having the desired degree of balance between hydrophilic and hydrophobic elements. Another variety of nonionic surfactant is the so-called polar nonionic typified by the amine oxides, phosphine oxides and sulfoxides.

Examples of suitable nonionic surfactants include:

1. The polyethylene oxide condensates of alkyl phenols. These componds include the condensation products of alkyl phenols having an alkyl group containing from about 6 to 12 carbon atoms in either a straight chain or branched chain configuration, with ethylene oxide, the said ethylene oxide being present in amounts equal to 5 to 25 moles of ethylene oxide per mole of alkyl phenol. The alkyl substituent in such compounds may be derived, for example, from polymerized propylene, diisobutylene, octene, or nonene. Examples of compounds of this type include nonyl phenol condensed with about 9.5 moles of ethylene oxide per mole of nonyl phenol, dodecyl phenol condensed with about 12 moles of ethylene oxide per mole of phenol, dinonyl phenol condensed with about 15 moles of ethylene oxide per mole of phenol, di-isooctylphenol condensed with about 15 moles of ethylene oxide per mole of phenol. Commercially available nonionic surfactants of this type include Igepal CO-610 marketed by the GAF Corporation; and Triton X-45, X-114, X-100 and X-102, all marketed by the Rohm and Haas Company.

2. The condensation products of aliphatic alcohols with ethylene oxide. The alkyl chain of the aliphatic alcohol may either be straight or branched and generally contains from about 8 to about 22 carbon atoms. Examples of such ethoxylated alcohols include the condensation product of about 6 moles of ethylene oxide with 1 mole of tridecanol, myristyl alcohol condensed with about 10 moles of ethylene oxide per mole of myristyl alcohol, the condensation product of ethylene oxide with coconut fatty alcohol wherein the coconut alcohol is a mixture of fatty alcohols with alkyl chains varying from 10 to 14 carbon atoms and wherein the condensate contains about 6 moles of ethylene oxide per mole of alcohol, and the condensation product of about 9 moles of ethylene oxide with the above-described coconut alcohol. Examples of commercially available nonionic surfactants of this type include Tergitol 15-S-9 marketed by the Union Carbide Corporation, Neodol 23-6.5 marketed by the Shell Chemical Company and Kyro EOB marketed by The Procter & Gamble Company. Preferred nonionic surfactants are the primary alcohol ethoxylates which are the subject of the commonly assigned copending application Ser. No. 453,464 of Jerome H. Collins entitled "Detergent Compositions." This Application discloses a grease and oil-removing composition that consists essentially of at least one ethoxylate material consisting essentially of a mixture of compounds having at least two levels of ethylene oxide addition and having the formula $$R_1 R_2 - O(CH_2CH_2O)_nH$$

wherein $R_1$ is a linear alkyl residue and $R_2$ has the formula $$-CHR_3CH_2-,$$

$R_3$ being selected from the group consisting of hydrogen and mixtures thereof with not more than 40% by weight of lower alkyl, wherein $R_1$ and $R_2$ together form an alkyl residue having a mean chain length in the range of 8-15 carbon atoms, at least 65% by weight of said residue having a chain length with $\pm$ 1 carbon atoms of the mean, wherein $3.5 < n_{av} < 6.5$ provided that the total amount by weight of components in which $n = 0$ shall be not greater than 5% and the total amount by weight of components in which $n = 2–7$ inclusive shall be not less than 63% based on the total weight of the or each said ethoxylate material and the HLB of the or each said ethoxylate material shall lie in the range of 9.5–11.5, said composition being otherwise free of nonionic surfactants having an HLB outside of this range.

Preferred embodiments of this invention utilize blends of primary alcohols in which at least 90% and most preferably 95% by weight of the alcohol has a chain length within ± 1 carbon atom of the mean, wherein the amount of unethoxylated alcohol is less than 1% by weight and wherein the amount of ethoxylated alcohols having 2–7 ethylene oxide groups is at least 70% by weight. Preferably ethoxylates having a mean chain length of $C_{12}$ and below contain at least 55% by weight of material having 2–6 ethoxylate groups while for ethoxylates having a chain length of $C_{12}$–$C_{13}$ at least 55% by weight of the material has 3–7 ethoxylate groups and ethoxylates having a chain length in the $C_{14-15}$ range preferably have at least 55% by weight of $E_3$–$E_8$ material. In the preferred embodiments of the invention the HLB of the ethoxylates are in the range of 10.0–11.1.

3. The condensation products of ethylene oxide with a hydrophobic base formed by the condensation of propylene oxide with propylene glycol. The hydrophobic portion of these compounds has a molecular weight of insolubility. The addition of polyoxyethylene moieties to this hydrophobic portion tends to increase the water-solubility of the molecule as a whole, and the liquid character of the product is retained up to the point where the polyoxyethylene content is about 50% of the total weight of the condensation product. Examples of compounds of this type include certain of the commercially available Pluronic surfactants marketed by the Wyandotte Chemicals Corporation.

4. The condensation products of ethylene oxide with the product resulting from the reaction of propylene oxide and ethylene diamine. The hydrophobic base of these products consists of the reaction product of ethylene diamine and excess propylene oxide, said base having a molecular weight of from about 2500 to about 3000. This base is condensed with ethylene oxide to the extent that the condensation product contains from about 40% to about 80% by weight of polyoxyethylene and has a molecular weight of from about 5,000 to about 11,000. Examples of this type of nonionic surfactant include certain of the commercially available Tetronic compounds marketed by the Wyandotte Chemicals Corporation.

5. Surfactants having the formula $R^1R^2R^3N{\rightarrow}O$ (amine oxide surfactants) wherein $R^1$ is an alkyl group containing from about 10 to about 28 carbon atoms, from 0 to about 2 hydroxy groups and from 0 to about 5 ether linkages, there being at least one moiety of $R^1$ which is an alkyl group containing from about 10 to about 18 carbon atoms and no ether linkages, and each $R^2$ and $R^3$ is selected from the group consisting of alkyl groups and hydroxyalkyl groups containing from 1 to about 3 carbon atoms.

Specific examples of amine oxide surfactants include: dimethyldodecylamine oxide, dimethyltetradecylamine oxide, ethylmethyltetradecylamine oxide, cetyldimethylamine oxide, dimethylstearylamine oxide, cetylethylpropylamine oxide, diethyldodecylamine oxide, diethyltetradecylamine oxide, dipropyldodecylamine oxide, bis-(2-hydroxyethyl)dodecylamine oxide, bis-(2-hydroxyethyl)-3-dodecoxy-1-hydroxypropylamine oxide, (2-hydroxypropyl)methyltetradecylamine oxide, dimethyloleylamine oxide, dimethyl-(2-hydroxydodecyl)amine oxide, and the corresponding decyl, hexadecyl and octadecyl homologs of the above compounds.

6. Surfactants having the formula $R^1R^2R^3P{\rightarrow}O$ (phosphine oxide surfactants) wherein $R^1$ is an alkyl group containing from about 10 to about 28 carbon atoms, from 0 to about 2 hydroxy groups and from 0 to about 5 ether linkages, there being at least one moiety of $R^1$ which is an alkyl group containing from about 10 to about 18 carbon atoms and no ether linkages, and each $R^2$ and $R^3$ is selected from the group consisting of alkyl groups and hydroxyalkyl groups containing from 1 to about 3 carbon atoms.

Specific examples of the phosphine oxide detergents include: dimethyldodecylphosphine oxide, dimethyltetradecylphosphine oxide, ethylmethyltetradecylphosphine oxide, cetyldimethylphosphine oxide, dimethylstearylphosphine oxide, cetylethylpropylphosphine oxide, diethyldodecylphosphine oxide, diethyltetradecylphosphine oxide, dipropyldodecylphosphine oxide, dipropyldodecylphosphine oxide, bis-(hydroxymethyl)-dodecylphosphine oxide, bis-(2-hydroxyethyl)dodecylphosphine oxide, (2-hydroxypropyl)methyltetradecylphosphine oxide, dimethyloleylphosphine oxide, and dimethyl-(2-hydroxydodecyl)phosphine oxide and the corresponding decyl, hexadecyl, and octadecyl homologs of the above compounds.

7. Surfactants having the formula

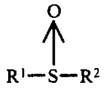

(sulfoxide surfactants) wherein $R^1$ is an alkyl group containing from about 10 to about 28 carbon atoms, from 0 to about 5 ether linkages and from 0 to about 2 hydroxyl substituents, at least one moiety of $R^1$ being an alkyl group containing no ether linkages and containing from about 10 to about 18 carbon atoms, and wherein $R^2$ is an alkyl group containing from 1 to 3 carbon atoms and from zero to two hydroxyl groups. Specific examples of sulfoxide surfactants include octadecyl methyl sulfoxide, dodecyl methyl sulfoxide, tetradecyl methyl sulfoxide, 3-hydroxytridecyl methyl sulfoxide, 3-methoxytridecyl methyl sulfoxide, 3-hydroxy-4-dodecoxybutyl methyl sulfoxide, octadecyl 2-hydroxyethyl sulfoxide, and dodecylethyl sulfoxide.

Ampholytic Synthetic Detergents

Ampholytic synthetic detergents can be broadly described as derivatives of aliphatic or aliphatic derivatives of heterocyclic secondary and tertiary amines in which the aliphatic radical may be straight chain or branched and wherein one of the aliphatic substituents contains from about 8 to 18 carbon atoms and at least one contains an anionic water-solubilizing group, e.g., carboxy, sulfonate, sulfate. Examples of compounds falling within this definition are sodium 3-(dodecylamino)propionate, sodium 3-(dodecylamino)-propane-1-sulfonate, sodium 2-(dodecylamino)ethyl sulfate, sodium 2-(dimethylamino)octadecanoate, disodium 3-(N-carboxymethyldodecylamino)propane-1-sulfonate, disodium octadecyl-iminodiacetate, sodium 1-carboxymethyl-2-undecylimidazole, and sodium N,N-bis(2-hydroxyethyl)-2-sulfato-3-dodecoxypropylamine. Sodium 3-(dodecylamino)propane-1-sulfonate is preferred.

Zwitterionic Synthetic Detergents

Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. The cationic atom in the quaternary compound can be part of a heterocyclic ring. In all of these compounds there is at least one aliphatic group, straight chain or branched, containing from about 3 to 18 carbon atoms and at least one aliphatic substituent containing an anionic water-solubilizing group, e.g., carboxy, sulfonate, sulfate, phosphate, or phosphonate. Examples of various classes of zwitterionic surfactants operable herein are described as follows:

1. Compounds corresponding to the general formula:

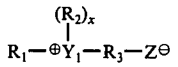

wherein $R_1$ is alkyl, alkenyl or a hydroxyalkyl containing from about 8 to about 18 carbon atoms and containing if desired up to about 10 ethylene oxide moieties and/or a glyceryl moiety; $Y_1$ is nitrogen, phosphorus or sulfur, $R_2$ is alkyl or monohydroxyalkyl containing 1 to 3 carbon atoms; $x$ is 1 when $Y_1$ is S, 2 when $Y_1$ is N or P; $R_3$ is alkylene or hydroxyalkylene containing from 1 to about 5 carbon atoms; and Z is a carboxy, sulfonate, sulfate, phosphate or phosphonate group.

Examples of this class of zwitterionic surfactants include 3-(N,N-dimethyl-N-hexadecylammonio)-propane-1-sulfonate;
3-(N,N-dimethyl-N-hexadecylammonio)-2-hydroxy-propane-1-sulfonate;
2-(N,N-dimethyl-N-dodecylammonio)acetate;
3-(N,N-dimethyl-N-dodecylammonio)propionate;
2-(N,N-dimethyl-N-octadecylammonio)ethane-1-sulfate;
3-(P,P-dimethyl-P-dodecylphosphonio)propane-1-sulfonate;
2-(S-methyl-S-tert-hexadecylsulfonio)ethane-1-sulfonate;
3-(S-methyl-S-dodecylsulfonio)propionate;
4-(S-methyl-S-tetradecylsulfonio)butyrate;
3-(N,N-dimethyl-N-4-dodecenylammonio)propane-1-sulfonate;
3-(N,N-dimethyl-N-2-diethoxyhexadecylammonio)propane-1-phosphate; and
3-(N,N-dimethyl-N-4-glyceryldodecylammonio)propionate.

Preferred compounds of this class from a commercial standpoint are 3-(N,N-dimethyl-N-hexadecylammonio)-2-hydroxy-propane-1-sulfonate;
3-(N,N-dimethyl-N-alkylammonio)-2-hydroxypropane-1-sulfonate, the alkyl group being derived from tallow fatty alcohol;

3-(N,N-dimethyl-N-hexadecylammonio)propane-1-sulfonate;
3-(N,N-dimethyl-N-tetradecylammonio)propane-1-sulfonate;
3-(N,N-dimethyl-N-alkylammonio)-2-hydroxypropane-1-sulfonate, the alkyl group being derived from the middle cut of coconut fatty alcohol;

3-(N,N-dimethyldodecylammonio)-2-hydroxypropane-1-sulfonate;
4-(N,N-dimethyl-tetradecylammonio)butane-1-sulfonate;
4-(N,N-dimethyl-N-hexadecylammonio)butane-1-sulfonate;
4-(N,N-dimethyl-hexadecylammonio)butyrate;
6-N,N-dimethyl-N-octadecylammonio)hexanoate;
3-(N,N-dimethyl-N-eicosylammonio)-3-methylpropane-1-sulfonate; and
6-(N,N-dimethyl-N-hexadecylammonio)hexanoate.

Means for preparing many of the surfactant compounds of this class are described in U.S. Pat. Nos. 2,129,264, 2,774,786, 2,813,898, 2,828,332 and 3,529,521 and; German Patent 1,018,421 all incorporate herein by reference.

2. Compounds having the general formula:

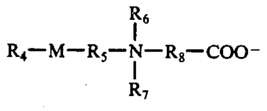

wherein $R_4$ is an alkyl, cycloalkyl, aryl, aralkyl or alkaryl group containing from 10 to 20 carbon atoms; M is a bivalent radical selected from the group consisting of aminocarbonyl, carbonylamino, carbonyloxy, aminocarbonylamino, the corresponding thio groupings and substituted amino derivatives; $R_5$ and $R_8$ are alkylene groups containing from 1 to 12 carbon atoms; $R_6$ is alkyl or hydroxyalkyl containing from 1 to 10 carbon atoms; $R_7$ is selected from the group consisting of $R_6$ groups $R_4$-M-$R_5$−, and —$R_8$COOMe wherein $R_4$, $R_5$, $R_6$ and $R_8$ are as defined above and Me is a monovalent salt-forming cation. Compounds of the type include N,N-bis(oleylamidopropyl)-N-methyl-N-carboxymethylammonium betaine; N,N-bis(stearamidopropyl)-N-methyl-N-carboxymethylammonium betaine; N-(stearamidopropyl)-N-dimethyl-N-carboxymethylammonium betaine; N,N-bis(oleylamidopropyl)-N-(2-hydroxyethyl)-N-carboxymethylammonium betaine; and N-N-bis-(stearamidopropyl)-N-(2-hydroxyethyl)-N-carboxymethylammonium betaine. Zwitterionic surfactants of this type are prepared in accordance with methods described in U.S. Pat. No. 3,265,719 and DAS 1,018,421.

3. compounds having the general formula:

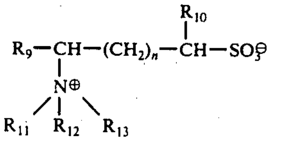

wherein $R_9$ is alkyl group, $R_{10}$ is a hydrogen atom or an alkyl group, the total number of carbon atoms in $R_9$ and $R_{10}$ being from 8 to 16 and

represents a quaternary ammonio group in which each group $R_{11}$, $R_{12}$ and $R_{13}$ is an alkyl or hydroxyalkyl group or the groups $R_{11}$, $R_{12}$ and $R_{13}$ are conjoined in a heterocyclic ring and *n* is 1 or 2. Examples of suitable zwitterionic surfactants of this type include the $\gamma$ and $\delta$ hexadecyl pyridino sulphobetaines, the $\gamma$ and $\delta$ hexadecyl $\gamma$-picolino sulphobetaines, the $\gamma$ and $\delta$ tetradecyl pyridino sulphobetaines and the hexadecyl trimethylammonio sulphobetaines. Preparation of such zwitterionic surfactants is described in British Patent 1,277,200.

4. Compounds having the general formula:

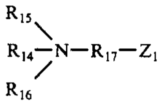

wherein $R_{14}$ is an alkarylmethylene group containing from about 8 to 24 carbon atoms in the alkyl chain; $R_{15}$ is selected from the group consisting of $R_{14}$ groups and alkyl and hydroxyalkyl groups containg from 1 to 7 carbon atoms; $R_{16}$ is alkyl or hydroxyalkyl containing from 1 to 7 carbon atoms; $R_{17}$ is alkylene or hydroxylalkylene containing from 1 to 7 carbon atoms and $Z_1$ is selected from the group consisting of sulfonate, carboxy and sulfate. Examples of zwitterionic surfactants of this type include 3-(N-dodecylbenzyl-N,N-dimethylammonio)propane-1-sulfonate; 4-(N-dodecylbenzyl-N,N-dimethylammonio)butane-1-sulfonate; 3-(N-hexadecylbenzyl-N,N-dimethylammonio)propane-1-sulfonate; 3-(N-dodecylbenzyl-N,N-dimethylammonio)propionate; 4-(N-hexadecylbenzyl-N,N-dimethylammonio)butyrate; 3-(N-tetradecylbenzyl-N,N-dimethylammonio)propane-1-sulfate; 3-(N-dodecylbenzyl-N,N-dimethylammonio)-2-hydroxypropane-1-sulfonate; 3-[N,N-di(dodecylbenzyl)-N-methylammonio]propane-1-sulfonate; 4-[N,N-di(hexadecylbenzyl)-N-methylammonio]butyrate; and 3-[N,N-di(tetradecylbenzyl)-N-methylammonio]-2-hydroxypropane-1-sulfonate.

Zwitterionic surfactants of this type as well as methods for their preparation are described in U.S. Pat. Nos. 2,697,116; 2,697,656 and 2,669,991 and Canadian Patent 883,864, all incorporated herein by reference.

5. Compounds having the general formula:

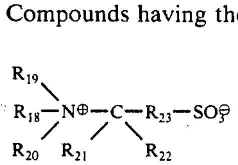

wherein $R_{18}$ is an alkylphenyl, cycloalkylphenyl or alkenylphenyl group containing from 8 to 20 carbon atoms, in the alkyl, cycloalkyl or alkenyl moiety; $R_{19}$ and $R_{20}$ are each aliphatic groups containing from 1 to 5 carbon atoms; $R_{21}$ and $R_{22}$ are each hydrogen atoms, hydroxyl groups or aliphatic groups containing from 1 to 3 carbon atoms and $R_{23}$ is an alkylene group containing from 2 to 4 carbon atoms.

Examples of zwitterionic surfactants of this type include 3-(N-dodecylphenyl-N,N-dimethylammonio)propane-1-sulfonate; 4-(N-hexadecylphenyl-N,N-dimethylammonio)butane-1-sulfonate; 3-(N-tetradecylphenyl-N,N-dimethylammonio)-3,3-dimethylpropane-1-sulfonate and 3-(N-dodecylphenyl-N,N-dimethylammonio)-3-hydroxypropane-1-sulfonate. Compounds of this type are described more fully in British Patents 970,883 and 1,046,252, incorporated herein by reference.

Of all the above-described types of zwitterionic surfactants, preferred compounds include 3(N,N-dimethyl-N-alkylammonio)-propane-1-sulfonate and 3(N,N-dimethyl-N-alkylammonio)-2-hydroxypropane-1-sulfonate wherein in both compounds the alkyl group averages 14.8 carbon atoms in length; 3(N,N-dimethyl-N-hexadecylammonio)-propane-1-sulfonate; 3(N,N-dimethyl-N-hexadecylammonio)-2-hydroxypropane-1-sulfonate; 3-(N-dodecylbenzyl-N,N-dimethylammonio)-propane-1-sulfonate; 3-(N-dodecylbenzyl-N,N-dimethylammonio)-2-hydroxypropane-1-sulfonate; (N-dodecylbenzyl-N,N-dimethylammonio)acetate; 3-(N-dodecylbenzyl-N,N-dimethylammonio)-propionate; 6-(N-dodecylbenzyl-N,N-dimethylammonio)hexanoate; and (N,N-dimethyl-N-hexadecylammonio)acetate.

Builder Salts

The detergent compositions of the instant invention contain, as an essential component, an alkaline, polyanionic detergent builder salt. In the present compositions these water-soluble alkaline builder salts serve to maintain the pH of the laundry solution in the range of from about 7 to about 12, preferably from about 8 to about 11. Furthermore, these builder salts enhance the fabric cleaning performance of the overall compositions while at the same time serve to suspend particulate soil released from the surface of the fabrics and prevent its redeposition on the fabric surfaces. Surprisingly, although the detergency builder salts serve to suspend clay soils of the kaolinite and illite types and prevent their redeposition on fabrics, they do not appear to interfere with the deposition on fabric surfaces of the smectite clay softeners used herein. Furthermore, these polyanionic builder salts have been found to cause the smectite clays present in the granular detergent formulations of the invention to be readily and homogeneously dispersed throughout the aqueous laundering medium with a minimum of agitation. The homogeneity of the clay dispersion is necessary for the clay to function effectively as a fabric softener, while the ready dispersability allows granular detergent compositions to be formulated.

Suitable detergent builder salts useful herein can be of the poly-valent inorganic and poly-valent organic types, or mixtures thereof. Non-limiting examples of suitable water-soluble, inorganic alkaline detergent builder salts include the alkali metal carbonates, borates, phosphates, polyphosphates, tripolyphosphates, bicarbonates, and sulfates. Specific examples of such salts include the sodium and potassium tetraborates, perborates, bicarbonates, carbonates, tripolyphosphates, pyrophosphates, orthophosphates and hexametaphosphates.

Other preferred inorganic builder salts are the alkali metal aluminosilicates of general formula in $Na_z(AlO_2)_z(SiO_2)_y \cdot x\ H_2O$ wherein *z* and *y* are integers of at least 6, the molar ratio of $z$ to $y$ is in the range from 1.0 to about 0.5 and $x$ is an integer from about 15 to about 264. Compositions incorporating builder salts of this type form the subject of the commonly assigned Application of John Michael Corkill, Bryan L. Madison and Michael E. Burns, Ser. No. 480,266 filed Mar. 11, 1974 and entitled "DETERGENT", the disclosure of which is incorporated herein by reference.

Examples of suitable organic alkaline detergency builder salts are: (1) water-soluble amino polyacetates, e.g., sodium and potassium ethylenediamine tetraacetates, nitrilotriacetates and N-(2-hydroxyethyl)nitrilodiacetates; (2) water-soluble salts of phytic acid, e.g., sodium and potassium phytates; (3) water-soluble polyphosphonates, including, sodium, potassium and lithium salts of ethane-1-hydroxy-1,1-diphosphonic acid; sodium, potassium and lithium salts of methylenediphosphonic acid and the like.

Additional organic builder salts useful herein include the polycarboxylate materials described in U.S. Pat. No. 2,264,103, including the water-soluble alkali metal salts of mellitic acid. The water-soluble salts of polycarboxylate polymers and copolymers such as are described in U.S. Pat. No. 3,308,067, incorporated herein by reference, are also suitable herein. It is to be understood that while the alkali metal salts of the foregoing inorganic and organic poly-valent anionic builder salts are preferred for use herein from an economic standpoint, the ammonium, alkanolammonium, e.g., triethanolammonium, diethanolammonium, and the like, water-soluble salts of any of the foregoing builder anions are useful herein.

Mixtures of organic and/or inorganic builders can be used herein. One such mixture of builders is disclosed in Canadian Patent 755,038, e.g., a ternary mixture of sodium tripolyphosphate, trisodium nitrilotriacetate and trisodium ethane-1-hydroxy-1,1-diphosphonate.

While any of the foregoing alkaline poly-anionic builder materials are useful herein, sodium tripolyphosphate, sodium nitrilotriacetate, sodium mellitate, sodium citrate and sodium carbonate are preferred herein for this builder use. Sodium tripolyphosphate is especially preferred herein as a builder both by virtue of its detergency builder activity and its ability to homogeneously and quickly disperse the smectite clays throughout the aqueous laundry media without interfering with clay deposition on the fabric surface. Sodium tripolyphosphate is also especially effective for suspending illite and kaolinite clay soils and retarding their redeposition on the fabric surface.

The detergent builders are used at concentrations of from about 10% to about 60%, preferably 20% to 50%, by weight of the detergent compositions of this invention.

Clay Minerals

The third essential component of the present compositions consists of particular smectite clay minerals to provide fabric softening and antistatic control concurrently with fabric cleansing. These smectite clays are present in the detergent compositions at levels from about 1% to about 50%, preferably from 5% to 15% by weight, of the total compositions.

The clay minerals used to provide the softening properties of the instant compositions can be described as expandable, three-layer clays, in which a sheet of aluminum/oxygen atoms or magnesium/oxygen atoms lies between two layers of silicon/oxygen atoms, i.e., alumino-silicates and magnesium silicates, having an ion exchange capacity of at least 50 meq/100 g. of clay. The term "expandable" as used to describe clays relates to the ability of the layered clay structure to be swollen, or expanded, on contact with water. The three-layer expandable clays used herein are examples of the clay minerals classified geologically as smectites.

There are two distinct classes of smectite clays that can be broadly differentiated on the basis of the numbers of octahedral metal-oxygen arrangements in the central layer for a given number of silicon-oxygen atoms in the outer layers. The dioctahedral minerals are primarily trivalent metal ion-based clays and are comprised of the prototype pyrophyllite and the members montmorillonite $(OH)_4Si_{8-y}Al_y(Al_{4-x}Mg_x)O_{20}$, nontronite $(OH)_4Si_{8-y}Al_y(Al_{4-x}Fe_x)O_{20}$, and volchonskoite $(OH)_4Si_{8-y}Al_y(Al_{4-x}Cr_x)O_{20}$, where $x$ has a value of from 0 to about 4.0 and $y$ has a value of from 0 to about 2.0. Of these only montmorillonites having exchange capacities greater than 50 meq/100 g. are suitable for the present invention and provide fabric softening benefits.

The trioctahedral minerals are primarily divalent metal ion based and comprise the prototype talc and the members hectorite $(OH)_4Si_{8-y}Al_y(Mg_{6-x}Li_x)O_{20}$, saponite $(OH)_4(Si_{8-y}Al_y)(Mg_{6-x}Al_x)O_{20}$, sauconite $(OH)_4Si_{8-y}Al_y(Zn_{6-x}Al_x)O_{20}$, vermiculite $(OH)_4Si_{8-y}Al_y(Mg_{6-x}Fe_x)O_{20}$, wherein $y$ has a value of 0 to about 2.0 and $x$ has a value of 0 to about 6.0. Hectorite and saponite are the only minerals in this class that are of value in the present invention, the static reduction or fabric softening performance being related to the type of exchangeable cation as well as to the exchange capacity.

It is to be recognized that the range of the water of hydration in the above formulas can vary with the processing to which the clay has been subjected.

As noted hereinabove, the clay minerals employed in the compositions of the instant invention contain cationic counterions such as protons, sodium ions, potassium ions, calcium ions, magnesium ions, lithium ions, and the like. It is customary to distinguish between clays on the basis of one cation predominantly or exclusively absorbed. For example, a sodium clay is one in which the absorbed cation is predominantly sodium. Such absorbed cations can become involved in exchange reactions with cations present in aqueous solutions. A typical exchange reaction involving a smectite clay is expressed by the following equation:

$$\text{smectite clay (Na)} + NH_4OH \rightleftarrows \text{smectite clay } (NH_4) + NaOH$$

Since in the foregoing equilibrium reaction, one equivalent weight of ammonium ion replaces an equivalent weight of sodium, it is customary to measure cation exchange capacity (sometimes termed "base exchange capacity") in terms of milliequivalents per 100 g. of clay (meq./100 g.). The cation exchange capacity of clays can be measured in several ways, including by electrodialysis, by exchange with ammonium ion followed by titration or by a methylene blue procedure, all as fully set forth in Grimshaw, "The Chemistry and Physics of Clays," pp. 264–265, Interscience (1971). The cation exchange capacity of a clay mineral relates to such factors as the expandable properties of the clay, the charge of the clay, which, in turn, is determined at least in part by the lattice structure, and the like. The ion exchange capacity of clays varies widely in the range from about 2 meq/100 g. for kaolinites to about 150 meq/100 g., and greater, for certain smectite clays. Illite clays although having a three layer structure, are of a non-expanding lattice type and have an ion exchange capacity somewhere in the lower portion of the range. i.e., around 26 meq/100 g. for an average illite clay. Attapulgites, another class of clay minerals, have a spicular (i.e. needle-like) crystalline form with a low cation exchange capacity (25–30 meq/100 g.). Their structure is composed of chains of silica tetrahedrons linked together by octahedral groups of oxygens and hydroxyls containing Al and Mg atoms.

It has been determined that illite, attapulgite, and kaolinite clays, with their relatively low ion exchange capacities, are not useful in the instant compositions. Indeed, illite and kaolinite clays constitute a major component of clay soils and, as noted above, are removed from fabric surfaces by means of the instant compositions. However the alkali metal montmorillonites, saponites, and hectorites and certain alkaline earth metal varieties of these minerals such as calcium montmorillonites have been found to show useful fabric softening benefits when incorporated in compositions in accordance with the present invention.

Specific non limiting examples of such fabric softening smectite clay minerals are:

| |
|---|
| Sodium Montmorillonite |
| Brock |
| Volclay BC |
| Gelwhite GP |
| Thixo-Jel #1 |
| Ben-A-Gel |
| Sodium Hectorite |
| Veegum F |
| Laponite SP |
| Sodium Saponite |
| Barasym NAS 100 |
| Calcium Montmorillonite |
| Soft Clark |
| Gelwhite L |
| Lithium Hectorite |
| Barasym LIH 200 |

Accordingly, smectite clays useful herein can be characterized as montmorillonite, hectorite, and saponite clay minerals having an ion exchange capacity of at least about 50 meq/100 g. and preferably at least 60 meq/100 g.

While not intending to be limited by theory, it appears that the advantageous softening (and potentially dye scavenging, etc.) benefits of the instant compositions are ascribable to the physical characteristics and ion exchange properties of the clay minerals used therein. Furthermore, the unique physical and electrochemical properties of the smectite clays apparently cause their interaction with, and dispersion by, the polyanionic builder salts used in the instant compositions. Thus, it has now been found that, rather than agglomerating to form viscous gels when contacted by water, the smectite clays used herein can be added to aqueous laundry baths in granular compositions containing polyanionic detergency builders of the type disclosed herein to yield homogeneous, clay suspensions. The problems of gelling and agglomeration usually encountered when smectite clays are added to aqueous media in solid form are alleviated by the presence of the builder. Apparently, the negative electrical charges on the builder anions serve to repulse the clay particles, thereby providing the desired homogeneous clay dispersion and preventing agglomeration. Whatever the reason for the advantageous co-action of the detergency builder and smectite clays used herein, the combination of polyanionic detergency builders with the specific aluminum-containing and magnesium-containing smectites, provides a means whereby such smectite clay minerals can be added in solid form to surfactant-containing media so as to give the homogeneous clay dispersion required for effective fabric softening and/or antistatic performance.

Most of the smectite clays useful in the compositions herein are commercially available under various tradenames, for example, Thixo-Jel #1 and Gelwhite GP from Georgia Kaolin Co., Elizabeth, New Jersey; Volclay BC and Volclay #325, from American Colloid Co., Skokie, Illinois; and Veegum F, from R. T. Vanderbilt. It is to be recognized that such smectite minerals obtained under the foregoing tradenames can comprise mixtures of the various discrete mineral entities. Such mixtures of the smectite minerals are suitable for use herein.

Within the classes of montmorillonite, hectorite, and saponite clay minerals having a cation exchange capacity of at least about 50 meq/100 g., certain clays are preferred for fabric softening purposes. For example, Gelwhite GP is an extremely white form of smectite clay and is therefore preferred when formulating white granular detergent compositions. Volclay BC, which is a smectite clay mineral containing at least 3% of iron (expressed as $Fe_2O_3$) in the crystal lattice, and which has a very high ion exchange capacity, is one of the most efficient and effective clays for use in laundry compositions and is preferred from the standpoint of product performance. On the other hand, certain smectite clays marketed under the name "bentonite" are sufficiently contaminated by other silicate minerals, as evidenced by a low colloid content ($\approx 50\%$) that their ion exchange capacity falls below the requisite range, and such clays are of no use in the instant compositions.

Bentonite, in fact, is a rock type originating from volcanic ash and contains montmorillonite (one of the smectite clays) as its principal clay component. The Table shows that materials commercially available under the name bentonite can have a wide range of cation exchange capacities and fabric softening performance.

| BENTONITE | SUPPLIER | EXCHANGE CAPACITY meq/100 g. | SOFTENING ABILITY |
|---|---|---|---|
| Brock | Georgia Kaolin Co. USA | 63 | Good |
| Soft Clark | Georgia Kaolin Co. USA | 84 | Good |
| Bentolite L | Georgia Kaolin Co. USA | 68 | Fair - Good |
| Clarolite T-60 | Georgia Kaolin Co. USA | 61 | Fair |
| Granulare Naturale Bianco | Seven C. Milan Italy | 23 | Fair - Poor |
| Thixo-Jel #4 | Georgia Kaolin Co. USA | 55 | Poor* |
| Granular Naturale Normale | Seven C. Milan Italy | 19 | Poor |
| Clarsol FB 5 | Ceca Paris France | 12 | Poor |
| PDL 1740 | Georgia Kaolin Co. USA | 26 | None |

-continued

| BENTONITE | SUPPLIER | EXCHANGE CAPACITY meq/100 g. | SOFTENING ABILITY |
|---|---|---|---|
| Versuchs Product FFI | Sud-Chemie Munich Germany | 26 | None |

*Low colloid content ($\approx$50%)

It has also been found that certain smectite minerals when incorporated into detergent compositions can reduce or eliminate the buildup of static electricity on fabrics washed in the compositions. The visible evidence that static buildup has been prevented as the absence of "cling," i.e., the tendency of different areas of fabric to adhere to one another, but a measure of the approach to static charge elimination is the mean voltage of the fabric. Commercial quaternary surfactant-based products generally give values of $\leqq$ 2 volts per square yard of fabric in eliminating "cling" but in some instance cling may not actually be apparent at higher voltages than this.

The smectite minerals that have proved to be beneficial in reducing static buildup when incorporated into detergent compositions are the lithium and magnesium hectorites and saponites, i.e., minerals of the structure $(OH)_4Si_{8-y}Al_y(Mg_{6-x}Li_x)O_{20}$ and $(OH)_4Si_{8-y}Al_yMg_{6-x}Al_xO_{20}$ respectively in which the counter ions are predominantly magnesium or lithium, i.e., at least 50% of the counter ions are $Li^+$ or $Mg^{++}$, the remainder being other alkaline earth or alkali metal counter ions.

Preferred minerals are those in which 75–90% of the counter ions are lithium or magnesium and for which the cation exchange capacities are greater than 60 meq/100 g. Specific examples of such preferred materials are magnesium hectorite, lithium hectorite, and magnesium saponite.

It is believed that the universal benefit given by the $Mg^{++}$ and $Li^+$ hectorite and saponite clay minerals is related to the size to charge ratio of these cations and the unusually large number of moles of water that can be held by them.

As noted earlier the prior art discloses that magnesium montmorillonite (used at approximately 1% by weight in water) can reduce the buildup of static electricity on fabrics but it has been found that this material is not of value in the present invention as shown in Example VII. Futhermore other minerals that have fabric softening characteristics such as the sodium and calcium montmorillonites, and the sodium hectorites and saponites also do not exhibit any appreciable anti-static activity in the compositions of the present invention. Consequently it is surprising that the magnesium and lithium hectorites and saponites do show this capability.

The level of incorporation of such clays in the detergent compositions of the present invention can be from 3% to 50% by weight of the composition but is preferably from 5% to 20% and most preferably from 5% to 15% by weight of the composition, the chosen level depending on material efficacy and desired performance.

Appropriate clay minerals for use herein can be selected by virtue of the fact that smectites exhibit a true 14A x-ray diffraction pattern. This characteristic pattern, taken in combination with exchange capacity measurements performed in the manner noted above, provides a basis for selecting particular smectite minerals for use in the granular detergent compositions disclosed herein.

Optional Components

The detergent compositions disclosed herein can contain other materials commonly used in such compositions. For example, various soil-suspending agents such as carboxymethylcellulose, corrosion inhibitors, dyes, fillers such as sodium sulfate and silica, optical brighteners, suds boosters, suds depressants, germicides, anti-tarnishing agents, pH adjusting agents such as sodium silicate, enzymes, and the like, well-known in the art for use in detergent compositions, can also be employed herein. Bound water can also be present in said detergent compositions.

The clay-containing detergent compositions of this invention are in granular form. The compositions can be prepared by simply admixing the appropriate ingredients in dry form. The compositions are then added to water to provide a laundering liquor containing the instant compositions to the extent of from about 0.02% to about 2% by weight. Soiled fabrics are added to the laundering liquor and cleansed in the usual manner. The effective amount of the detergent compositions to be used will depend to an extent on the weight of clothes being laundered and their degree of soiling. Aqueous laundering baths containing said compositions provide adequate cleaning and softening benefits with soiled fabrics, especially cotton and cotton/polyester blends. The suspended clay material found in the laundering liquor also serves to adsorb fugitive dye in solution, thereby reducing or inhibiting dye transfer.

The granular built detergent compositions and the fabric laundering, softening, and static reduction process of the instant invention are illustrated by the following examples. Desized cotton terry washcloths were washed in aqueous solutions having dissolved therein various clay-containing built granular detergent compositions of the instant invention. Softness of the terry swatches so washed was compared with the softness of terry swatches washed in an equivalent concentration of the same built granular detergent without the clay, as well as with the softness of terry swatches washed in this same no-clay detergent solution followed by rinsing in water containing a commercially available fabric softener, Downy. Composition and solution concentrations are described in Table I below.

The terry swatches were washed for 10 minutes in a miniature agitator containing two gallons of washing liquor at 120° F. and 7 gr/gal. artificial hardness. The swatches comprised 4% by weight of the washing liquor. After washing, the swatches were spun dry and rinsed with two gallons of water at 120° F. and 7 grains/gallon artificial hardness. Swatches were then dried in a conventional electric dryer.

After several treatment cycles, the test and control swatches were graded tactilely for softness by a panel of three to five judges making paired comparisons of all swatches. Graders assigned an integer grade of from 0 to 4 on a linear scale to the softer treatment of each pair, assigning the higher grades to corresponding larger differences in softness. The data obtained were analyzed statistically to obtain mean softness grades (panel score units) for each treatment and a statistical estimate of the least significant difference (LSD) at the 95% confidence level. Results of the softening tests appear in Table I.

TABLE I

| | Composition No. | | | | | |
|---|---|---|---|---|---|---|
| Component - wt. % | 1 | 2 | 3 | 4 | 5 | 6 |
| Anionic Surfactant* | 16.8 | 16.8 | 16.8 | 15.3 | 8.4 | 16.8 |
| Sodium tripolyphosphate | 32.9 | 32.9 | 32.9 | 45.0 | 24.7 | 49.5 |
| Sodium Silicate | 5.9 | 5.9 | 5.9 | 5.37 | 2.9 | 5.9 |
| Sodium Sulfate | 19.6 | 29.6 | 29.6 | 12.8 | 7.0 | 14.1 |
| Miscellaneous minors, | ~4.1 | ~4.1 | ~4.1 | ~2.8 | ~1.6 | ~3.1 |
| Gelwhite GP** | 10.0 | | | | | |
| Volclay BC*** | | | | 9.1 | 50.0 | |
| Moisture | Balance | Balance | Balance | Balance | Balance | Balance |
| Solution Concentration (Wt. %) of composition | 0.104 | 0.104 | 0.104 | 0.11 | 0.20 | 0.104 |
| Solution pH | 9.5 | 9.2 | 9.2 | 9.3 | 9.3 | 9.2 |
| Rinse | Water | Water | Downy (0.07% wt.) | Water | Water | Water |
| Number of Cycles | 4 | 4 | 4 | 2 | 2 | 2 |
| Mean Softness Grade (Panel Score Units) | 0.8 | −2.1 | 0.2 | −0.5 | 1.7 | −2.6 |
| Least Significant Difference (LSD) | | 0.9 | | | 1.0 | |

*A mixture in a 1.22:1 wt. ratio of sodium tallow alkyl sulfate and sodium linear alkyl benzene sulfonate wherein the alkyl chain of the sulfonate averages 11.8 carbon atoms in length.
**A commercially-available sodium montmorillonite clay having an ion-exchange capacity of about 100 meq./100 g.
***A Commercially-available sodium montmorillonite clay having an ion-exchange capacity of about 85–100 meq./100 g.

It can be seen from Table I that Compositions 1, 4 and 5 of the instant invention provide softening benefits superior to built detergent formulations containing no clay softening agents and softening benefits comparable to those obtained with a commercial fabric softening rinse additive.

Compositions 1, 4 and 5 of the instant invention also provide excellent cleaning and detergency when employed in washing solutions at the specified concentrations.

Substantially similar detergency and softening results are obtained when the anionic surfactant mixture in Composition 1, 4 or 5 (Table I) is replaced with an equivalent amount of 2-acetoxy-tridecane-1-sulfonic acid; sodium methyl-alpha-sulfopalmitate; sodium beta-methoxyoctadecyl-sulfonate; sodium coconut alkyl ethylene glycol ether sulfonate or the sodium salt of the sulfuric acid ester of the reaction product of one mole of tallow fatty alcohol and three moles of ethylene oxide.

Substantially similar detergency and softening are obtained when a minor proportion, e.g. 25–30%, of the anionic surfactant mixture in Composition 1,4 or 5 (Table I) is replaced with an equivalent amount of the condensation product of coconut fatty alcohol with about 6 moles of ethylene oxide per mole of coconut fatty alcohol, the condensation product of tallow fatty alcohol with about 11 moles of ethylene oxide per mole of tallow fatty alcohol or the condensation product of a secondary fatty alcohol containing about 15 carbon atoms with about 9 moles of ethylene oxide per mole of fatty alcohol.

Substantially similar detergency and softening are obtained when the anionic surfactant mixture in Composition 1, 4 or 5 (Table I) is replaced with an equivalent amount of 3(N,N-dimethyl-N-alkylammonio)-propane-1-sulfonate or 3(N,N-dimethyl-N-alkylammonio)-2-hydroxypropane-1-sulfonate wherein in both compounds the alkyl group averages 14.8 carbon atoms in length 3(N,N-dimethyl-N-hexadecylammonio)-propane-1-sulfonate; 3(N,N-dimethyl-N-hexadecylammonio)-2-hydroxypropane-1-sulfonate; 3-(N-dodecylbenzyl-N,N-dimethylammonio)-propane-1-sulfonate; (N-dodecylbenzyl-N,N-dimethylammonio)acetate; 3-(N-dodecylbenzyl-N,N-dimethylammonio)propionate; 6-(N-dodecylbenzyl-N,N-dimethylammonio)hexanoate; (N,N-dimethyl-N-hexadecylammonio)-acetate, or sodium 3-(dodecylamino)propane-1-sulfonate.

Substantially similar detergency and softening are obtained when the sodium tripolyphosphate builder in Composition 1, 4 or 5 (Table I) is replaced with an equivalent amount of sodium nitrilotriacetate, sodium mellitate, sodium citrate or sodium carbonate.

Substantially similar detergency and softening are obtained when the clay softening agent in Compositions 1, 4 or 5 (Table I) is replaced with an equivalent amount of alkali metal, saponite or hectorite, all such clays having an ion-exchange capacity greater than 50 meq./100 g.

In addition to the unexpected fabric softening benefits which the built laundry detergent compositions of this invention provide, there are other advantages which this invention makes possible. For instance, dye-transfer inhibition noted above is a significant advantage not commonly shared by ordinary fabric softening compositions.

Moreover, the particular class of clays described herein which are deposited on the fabrics provide a soil-release benefit. The clays are adsorbed by the fabrics being washed providing an improved soil-release surface. The benefit from this treatment is that during subsequent washings, stains and soils are more easily removed from the fabrics as compared to a fabric which has not previously been exposed to a treatment by the clay-containing compositions of this invention. Still further, all of these benefits are enjoyed without impairing the water-absorbent qualities of the treated fabric. This is in marked contrast with ordinary quaternary ammonium fabric softeners which may tend to reduce the water-absorbent property of treated fabrics after several cycles.

It is especially significant that each of the advantages described above in no way impair or interfere with the general overall cleaning effectiveness of the detergent composition. The fact that these achievements are attained during the relatively brief span of a short washing cycle, for example about 6 to about 15 minutes, is especially noteworthy.

Antistatic benefits realized by compositions made in accordance with the present invention are illustrated by the following examples:

EXAMPLE I

Minibundles containing differing cloth types were made by using the following fabrics:

| # of Items | Description of Items | Source |
|---|---|---|
| 4 | Cotton terry washcloths | Standard Textile |
| 2 | Dacron texturized double knit swatches, Style 720, type 56 | Test Fabrics, Inc. |
| 2 | Nylon jersey swatches, Style 322 | Test Fabrics, Inc. |
| 2 | Polyester-cotton blend swatches 65% Dacron 54W/35% cotton shirting with durable press finish, Style 7406 WRL | Test Fabrics, Inc. |

The total area of each test bundle was 2.3 square yards. Each test bundle was desized by washing twice at 125° F in a commercially available granular laundry detergent and by washing once in deionized water.

Each bundle was then washed in a "Miniwasher" machine which is a vertical clyindrical vessel holding 4.6 liters of water and fitted with a paddle rotating on a vertical axis. Deionized water to which 7 grains/US gallon of mineral hardness (Ca:Mg = 2:1) had been added was used and the wash conditions comprised a 10 minute wash at 105° F followed by a 5 minute spin, a 2 minute rinse using water at 105° F and a final 5 minute spin. Drying took place in a Maytag Porta dryer equipped with a thermostat set at 140° F.

After drying the bundle was then placed in a Faraday Cage and the voltage read. Fabric pieces were then removed in random order, the cage voltage being read after each removal. The absolute value of voltage for each fabric piece was then totalled and divided by the total fabric area in the bundle to give a voltage value/sq. yard of fabric averaged over all fabric types. As each fabric was removed from the cage, an assessment of "cling" was also made. The test included two control formulations, "Downy," a commercially available cationic-based fabric softening liquid and a heavy duty granular formulation identified hereinafter as P and comprising:

| | |
|---|---|
| $NaC_{11-8}$ linear alkylbenzene sulphate | 7.0% |
| $NaC_{12-18}$alkyl ether sulphate | 7.0% |
| $NaC_{16-18}$alkyl sulphate | 4.0% |
| Sodium Tripolyphosphate | 24.5% |
| Sodium Silicate | 12.0% |
| Sodium Sulphate | 37.0% |
| Miscellaneous | 2.5% |
| Moisture | 6.0& |
| | 100.0% |

Both control formulations were used as recommended levels and in the recommended manner. Product P was added at 1 cup equivalent usage (≈ to 1200 ppm by wt. product concentration) and was predissolved before adding the minibundle. Downy was added at 1½ caps equivalent usage (≈ 900 ppm product concentration) in the rinse cycle after the addition of the rinse water.

Results are given below for a series of five treatments:

| Treatment | Cling | No. of Occasions | Total voltage per sq.yd. fabric (εV/sq.yd.) |
|---|---|---|---|
| Product P | Yes | 2 | 5.96 |
| Downy | No | — | 0.35 |
| Product P + 13% Montmorillonite (Brock) (cation exchange capacity 63 meq/100 gr) | Yes | 1 | 4.30 |
| Product P + 13% Sodium saponite (cation exchange capacity 88 meq./100 gr.) | Yes | 1 | 1.61 |
| Product P + 13% Sodium Montmorillonite + 5% Magnesium saponite (cation exchange capacity 81 meq./100 gr.) | No | — | 2.83 |

It can be seen that Product P has several instances of "cling" and a high value for ΣV/sq. yd. while the Downy control has no "cling" and a low value for ΣV/sq.yd. The various clay treatments show that sodium montmorillonite at a level of 13% by weight of the product provides little antistatic benefit whereas magnesium saponite provides a voltage reduction and no cling. Sodium saponite at a level of 13% while giving a low ΣV/sq.yd. relative to Product P, does not eliminate cling.

EXAMPLE II

The procedure of Example I was repeated with five further treatments, the results of which are given below:

| Treatment | Cling | No. of Occasions | εV/sq. yd. |
|---|---|---|---|
| Product P | Yes | 2 | 10.0 |
| Downy | No | — | 0.7 |
| Product P + 13% Sodium Montmorillonite (Brock) + 5% Magnesium Saponite | No | — | 1.4 |
| Product P + 13% Sodium Montmorillonite (Brock) + 5% Magnesium Hectorite caton exchange capacity 123 meq./100 gr.) | No | — | 4.8 |
| Product P + 13% Sodium montmorillonite + 5% Lithium Hectorite (cation exchange capacity 60 meq./100 gr.) | No | — | 2.0 |

In this series of treatments Runs 190 1 and 2 were the high and low voltage controls, Run 3 repeated Run 5 of Example I and Runs 4 and 5 demonstrated the efficacy of other clay minerals useful in compositions according to the present invention as antistat additives.

EXAMPLE III

The procedure of Example I was repeated with the treatments below:

| Treatment | Cling | No. of Occasions | εV/sq.yd. |
|---|---|---|---|
| Product P | Yes | 1 | 7.0 |
| Downy | No | — | 0.21 |

-continued

| Treatment | Cling | No. of Occasions | ϵV/sq.yd. |
|---|---|---|---|
| Product P + 15% Sodium Saponite | Yes | 1 | 6.87 |
| Product P + 10% Sodium Saponite + 5% Magnesium Hectorite | No | — | 6.1 |
| Product P + 10% Sodium Saponite + 5% Magnesium Saponite | No | — | 3.65 |

Runs 4 and 5 again show the efficacy of magnesium hectorite and magnesium saponite in eliminating cling.

EXAMPLE IV

The procedure of Example I was repeated with the following treatments:

| Treatment | Cling | No. of Occasions | Total voltage per sq.yd. fabric ϵV/sq.yd. |
|---|---|---|---|
| Product P | Yes | 1 | 4.52 |
| Downy | No | — | 0.39 |
| Product P + 3% Magnesium Hectorite | Yes | 1 | 6.04 |
| Product P + 8% Magnesium Hectorite | No | — | 1.83 |
| Product P + 12% Magnesium Hectorite | No | — | 1.72 |

This series of runs demonstrates the level of Magnesium hectorite needed to eliminate cling. It can be seen that 3% is insufficient whereas 8% is adequate. Run 4 of Example IV indicated that 5% Magnesium hectorite is also adequate to eliminate cling.

EXAMPLE V

The fabrics used in Example IV were subjected to a second identical wash cycle, i.e., Example IV was repeated using the same bundle of fabrics for each treatment. None of the fabrics washed with Magnesium hectorite containing formulations showed any cling, indicating that a build-up effect exists and that satisfactory antistat performance can be obtained at an antistat level of 3% in multicycle wash treatments.

EXAMPLE VI

The procedure of Example I was repeated with the following treatments:

| Treatment | Cling | No. of Occasions | Total voltage per sq./yd. fabric ϵV/sq.yd. |
|---|---|---|---|
| Product P | Yes | 2 | 6.04 |
| Product P + 10% Sodium saponite + 5% Lithium hectorite | No | — | 3.30 |
| Product P + 10% Sodium saponite + 5% Magnesium hectorite | No | — | 2.52 |
| Product P + 10% Sodium saponite + 5% Magnesium saponite | No | — | 1.74 |
| Downy | No | — | 1.13 |

This series of runs demonstrates further that a level of 5% of either lithium or magnesium hectorite or saponite eliminates cling and provides a satisfactory reduction in ΣV/sq.yd.

EXAMPLE VII

The procedure of Example I was repeated with the following treatments:

| Treatment | Cling | No. of Occasions | Total voltage per sq. yd. (ϵV/sq. yd.) |
|---|---|---|---|
| Product P | Yes | 2 | 9.3 |
| Downy | No | — | 1.6 |
| Product P + 13% Magnesium saponite | No | — | 4.7 |
| Product P + 13% Sodium montmorillonite | Yes | 1 | 8.8 |
| Product P + 13% Magnesium montmorillonite | Yes | 2 | 10.6 |

This example shows that magnesium montmorillonite does not eliminate cling or provide appreciable reduction in fabric voltage.

What is claimed is:

1. A granular, built laundry detergent composition consisting essentially of:

a. from about 5% to about 20% by weight of a water soluble non-soap synthetic detergent compound selected from the group consisting of anionic synthetic detergents, nonionic synthetic detergents, ampholytic synthetic detergents, zwitterionics synthetic detergents, and mixtures thereof;

b. from about 10% to about 60% by weight of an organic or inorganic detergent builder salt; and c. from about 1% to about 50% by weight of a smectite clay selected from the group consisting of sodium and calcium montmorillonites, sodium saponites, sodium hectorites, lithium and magnesium hectorites, lithium and magnesium saponites, and mixtures thereof, having a cation exchange capacity of at least about 60 meq/100g., said composition providing a solution pH of from about 7 to about 12 when dissolved in water at a concentration of about 0.12% by weight.

2. A composition in accordance with claim 1 wherein the smectite clay is an antistat agent selected from the group consisting of saponites and hectorites, at least 50% of the cations of which are lithium or magnesium ions, said smectite clay being present at a level of 3–15% by weight of the composition.

3. A composition in accordance with claim 2 wherein 75–90% of the cations are lithium or magnesium ions.

4. A composition in accordance with claim 1 a. wherein the synthetic detergent compound is an anionic synthetic detergent;

b. wherein the builder salt is selected from the group consisting of alkali metal carbonates, alkali metal borates, alkali metal phosphates, alkali metal polyphosphates, alkali metal bicarbonates, alkali metal sulfates, water-soluble amino polyacetates, water-soluble salts of phytic acid, and water-soluble polyphosphonates and is present to the extent of from about 20% to about 50% by weight; and c. wherein the smectite clay is a softening agent selected from the group consisting of sodium and calcium montmorillonites, sodium saponites, sodium hectorites, lithium and magnesium hectorites, lithium and magnesium saponites, and mixtures thereof, and is present to the extent of from about 5% to about 15% by weight.

5. A composition in accordance with claim 4 wherein the smectite clay is selected from the group consisting of sodium and calcium montmorillonites, sodium saponites and sodium hectorites having a cation exchange capacity greater than 60 meq/100 gr.

6. A composition in accordance with claim 5 wherein the anionic surfactant is a water-soluble salt of an organic sulfuric reaction product containing an alkyl group of from about 8 to about 22 carbon atoms and a moiety selected from the group consisting of sulfuric acid ester moieties and sulfonic acid moieties.

7. A composition in accordance with claim 6 wherein the anionic surfactant is selected from the group consisting of sodium linear alkyl benzene sulfonate wherein the alkyl chain averages from about 10 to 18 carbon atoms in length, sodium tallow alkyl sulfate; 2-acetoxy-tridecane-1-sulfonic acid; sodium methyl-alpha-sulfopalmitate; sodium Beta-methoxyoctadecylsulfonate; sodium coconut alkyl ethylene glycol ether sulfonate; the sodium salt of the sulfuric acid ester of the reaction product of one mole of tallow fatty alcohol and three moles of ethylene oxide; and mixtures thereof.

8. A composition in accordance with claim 7 wherein the builder salt is selected from the group consisting of sodium tripolyphosphate, sodium nitrilotriacetate, sodium mellitate, sodium citrate and sodium carbonate.

9. A granular, built laundry detergent and fabric softening composition consisting essentially of:

a. from about 5% to about 20% of a mixture, in a 1.22:1 weight ratio, of sodium tallow alkyl sulfate and sodium linear alkyl benzene sulfonate wherein the alkyl chain of the sulfonate averages about 12 carbon atoms in length;

b. from about 20% to about 50% of a sodium tripolyphosphate builder salt; and c. from about 5% to about 15% of a sodium montmorillonite clay softening agent having a cation exchange capacity greater than 60 meq/100 g.

10. A process for the simultaneous laundering and feel improvement of fabrics comprising contacting said fabrics with an aqueous medium containing from about 0.02% by weight to about 2% by weight of a composition in accordance with claim 1.

* * * * *

REEXAMINATION CERTIFICATE (310th)

United States Patent [19]

[11] B1 4,062,647

Storm et al.

[45] Certificate Issued Feb. 26, 1985

[54] CLAY-CONTAINING FABRIC SOFTENING DETERGENT COMPOSITIONS

[75] Inventors: Thomas D. Storm, Waterloo, Belgium; Joseph P. Nirschl, Fairfield, Ohio

[73] Assignee: The Procter & Gamble Company, Cincinnati, Ohio

Reexamination Request:
No. 90/000,298, Nov. 26, 1982

Reexamination Certificate for:
Patent No.: 4,062,647
Issued: Dec. 13, 1977
Appl. No.: 486,274
Filed: Jul. 8, 1974

Related U.S. Application Data

[63] Continuation-in-part of Ser. No. 271,943, Jul. 14, 1972, abandoned.

[51] Int. Cl.[3] ........................ C09K 3/16; C11D 3/12; C11D 3/14; D06M 11/06

[52] U.S. Cl. ........................................ 8/137; 252/8.6; 252/8.7; 252/8.8; 252/135; 252/140; 252/155; 252/174.25

[58] Field of Search ............... 252/8.6, 131, 140, 155, 252/174.25, 179

[56] References Cited

U.S. PATENT DOCUMENTS

| | | | |
|---|---|---|---|
| 2,187,536 | 1/1940 | Avedikian | 252/116 |
| 2,494,784 | 1/1950 | Tiger | 252/175 |
| 2,531,427 | 11/1950 | Hauser | 260/448 |
| 2,805,993 | 9/1957 | Barnard | 252/8.8 |
| 3,594,212 | 7/1971 | Ditsch | 117/62 |
| 3,594,221 | 7/1971 | Baldwin | 117/138.5 |
| 3,625,905 | 12/1971 | Weast | 252/109 |
| 3,852,211 | 12/1974 | Ohren | 252/110 |

FOREIGN PATENT DOCUMENTS 401413 11/1933 United Kingdom ............... 252/113

OTHER PUBLICATIONS

Hugh S. Spence, *Bentonite*, Canada Department of Mines No. 626, (1924).

Sidney D. Wells, "Wilinite, A New Loading Material", Paper 27, No. 14, 19-21, 34, (1920).

Ladoo and Myers, *Nonmetallic Minerals*, Second Edition, McGraw-Hill, (1951).

*The Merck Index*, Ninth Edition, Merck Co., Inc., (1976).

John Glenn, Bentonite in Soaps and Cosmetics, *Soap Perfumery and Cosmetics*, pp. 1012-1014, (1938).

Adams & Evans, Determination of the Cation-Exchange Capacity (Layer Charge) of Small Quantities of Clay Minerals by Nephelometry, Clay and Clay Minerals, vol. 27, No. 2, p. 137, (1979).

Rengasamy, vanAssche & Uytterhoeven, Particle Size of Wyoming Bentonite and its Relation to the Cation Exchange Capacity and the Homogeneity of the Charge Density, G. Chem. Soc. Faraday Trans. I, 72(2); 376-381, (1976).

Carlson & Overstreet, A Study of the Ion Exchange Behavior of the Alkaline Earth Metals, Soil Science, 103, #3, pp. 213-218, (1967).

"Volclay Bentonite in Soaps, Cleaners and Polishes", Data Sheet No. 200/210, Published by American Colloid Co., 1940, 4 pages.

"Volclay in Soaps, Detergents, Polishes and Laundries", Data Sheet No. 209, Published by American Colloid Co., 1962, 2 pages.

"Color Spark" Bulletin No. 4 of Technical Service Dept., J. B. Ford Division of Wyandotte Chemicals Corp., dated 10-4-51, 3 pages.

*Primary Examiner*—Dennis L. Albrecht

[57] ABSTRACT

Granular, built laundry detergent compositions containing particular smectite clay minerals. Compositions containing such clays provide softening and/or antistatic benefits to fabrics washed therein.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4, and 8 are determined to be patentable as amended.

Claims 2, 3, 5-7, 9, and 10, dependent on an amended claim, are determined to be patentable.

New claim 11 is added and determined to be patentable.

1. A granular, built laundry detergent composition consisting essentially of:

(a) from about 5% to about 20% by weight of a water soluble non-soap synthetic detergent compound selected from the group consisting of anionic synthetic detergents, nonionic synthetic detergents, ampholytic synthetic detergents, [zwitterionics] *zwitterionic* synthetic detergents, and mixtures thereof;

(b) from about 10% to about 60% by weight of [an organic or inorganic] *a polyphosphate* detergent builder salt; and (c) from about 1% to about [50%] 15% by weight of a smectite clay selected from the group consisting of sodium and calcium montmorillonites, sodium saponites, sodium hectorites, lithium and magnesium hectorites, lithium and magnesium saponites, and mixtures thereof, having a cation exchange capacity of at least about 60 meq/100 g., said composition providing a solution pH of from about 7 to about 12 when dissolved in water at a concentration of about 0.12% by weight.

4. A composition in accordance with claim 1

(a) wherein the synthetic detergent compound is an anionic synthetic detergent;

(b) wherein the builder salt is [selected from the group consisting of alkali metal carbonates, alkali metal borates, alkali metal phosphates, alkali metal polyphosphates, alkali metal bicarbonates, alkali metal sulfates, water-soluble amino polyacetates, water-soluble salts of phytic acid, and water-soluble polyphosphonates and is] present to the extent of from about 20% to about 50% by weight; and (c) wherein the smectite clay is a softening agent selected from the group consisting of sodium and calcium montmorillonites, sodium saponites, sodium hectorites, lithium and magnesium hectorites, lithium and magnesium saponites, and mixtures thereof, and is present to the extent of from about 5% to about 15% by weight.

8. A composition in accordance with claim 7 wherein the builder salt is [selected from the group consisting of] sodium tripolyphosphate[, sodium nitrilotriacetate, sodium mellitate, sodium citrate and sodium carbonate].

*11. A composition in accordance with claim 1 wherein the detergent builder salt comprises sodium tripolyphosphate.*

* * * * *